United States Patent
Berghmans et al.

(10) Patent No.: US 6,573,306 B1
(45) Date of Patent: Jun. 3, 2003

(54) PROCESS FOR THE PREPARATION OF EXPANDABLE POLYVINYLARENE PARTICLES

(75) Inventors: Michel Florentine Jozef Berghmans, Breda (NL); Karel Cornelis Bleijenberg, Breda (NL); Alphonsus Catharina Gerardus Metsaars, Rijen (NL)

(73) Assignee: Nova Chemical (International) S.A., Fribourg (CH)

( * ) Notice: Subject to any disclaimer, the term of this patent is extended or adjusted under 35 U.S.C. 154(b) by 0 days.

(21) Appl. No.: 09/786,792

(22) PCT Filed: Sep. 14, 1999

(86) PCT No.: PCT/EP99/06997

§ 371 (c)(1), (2), (4) Date: Aug. 22, 2001

(87) PCT Pub. No.: WO00/15702

PCT Pub. Date: Mar. 23, 2000

(30) Foreign Application Priority Data

Sep. 16, 1998 (EP) .............................. 98203098

(51) Int. Cl.$^7$ .................................. C08J 9/22
(52) U.S. Cl. .................... 521/58; 264/50; 264/DIG. 9; 521/60
(58) Field of Search ....................... 521/58, 60; 264/50, 264/DIG. 9

(56) References Cited

U.S. PATENT DOCUMENTS 5,049,328 A * 9/1991 Meyer et al.

FOREIGN PATENT DOCUMENTS

GB 1289024 * 9/1972

* cited by examiner

Primary Examiner—Morton Foelak
(74) Attorney, Agent, or Firm—Suzanne Kikel

(57) ABSTRACT

Process for the preparation of expandable polyvinylarene particles in which compact polyvinylarene particles are impregnated by an inorganic $N_2$- and/or $O_2$-containing gas at a temperature below 95° C. and at a pressure of 100 to 2,000 kPa gauge.

11 Claims, No Drawings

PROCESS FOR THE PREPARATION OF EXPANDABLE POLYVINYLARENE PARTICLES

The present invention relates to a process for the preparation of expandable polyvinylarene particles and to a process for expanding these particles and to the preparation of foamed articles from the expanded particles thus expanded.

For many years it has been known that particles of polyvinylarenes, such as polystyrene, can be rendered expandable and that the particles thus obtained can be used in the preparation of foamed articles. In this respect reference is made to, e.g., U.S. Pat. No. 2,681,321 which discloses a process in which polystyrene particles are exposed to liquid hydrocarbons and treated such that the liquid hydrocarbon is dispersed in the polystyrene particles. Particles thus prepared contain generally 4 to 8% wt of such liquid hydrocarbon, such as butane, n-pentane or mixtures of pentanes. These particles can then be expanded to beads with a reduced density. Apparent densities for packaging particles typically are 20 to 60 kg/m$^3$. Once expanded, the particles are fused in a steam-heated mould to yield a foamed article of a desired shape.

One of the factors that influence the expansion of the polystyrene particles is the amount of hydrocarbon blowing agent. From Kirk Othmer, Encyclopedia of Chemical Technology, third edition, Volume 21, page 838, it can be read that the density of particles containing 5.7% wt n-pentane is typically 1080 kg/m$^3$, compared to a value of 1050 kg/m$^3$ for pure polystyrene beads and compared with a calculated density of 1020 kg/m$^3$ for a simple mixture in which the n-pentane is dissolved in polystyrene. If all pentane would be in voids the calculated density would be 1120 kg/m$^3$. Thus it has been suggested that part of the hydrocarbon blowing agent is present in little voids in the polystyrene. The skilled man will appreciate that the above densities are particle densities, which can be recalculated to apparent densities. A particle density of 1050 kg/m$^3$ corresponds to an apparent density of around 680 kg/m$^3$.

A drawback of the present practice is that during the transport and storage of the unexpanded particles hydrocarbons may evaporate from the particles, in particular from the voids. When the particles are transported and/or stored at varying temperatures and/or duration, the amounts of e.g. pentane retained may vary significantly. Apart from extra safety measures that have to be taken during transport, like gas-tight packaging, it will be appreciated that such a variation may have an effect on the resulting foam obtained after expansion.

Furthermore, the expansion process itself also causes that hydrocarbons originally present in the unexpanded particles are emitted into the environment. In order to reduce the emissions, complicated equipment has been developed to collect the emitted hydrocarbons for further handling, i.e. combustion. This equipment is to be installed in the facilities of the end-user of the particles, i.e. the customer who produces the foamed articles. This requires additional expertise and investments with these customers.

U.S. Pat. No. 5,358,675 discloses a process in which a polymeric material, e.g. polystyrene, is combined with another second phase material, e.g. a rubber, in an extruder at elevated temperature. The mixture is impregnated with nitrogen at pressures ranging from 800 up to 2000 psi (5,500–13,800 kPa). The presence of the rubber is necessary to obtain a suitable cell size above 10 μm. If no rubber is added the cells obtained are too small. Although the process of this document overcomes the environmental problem, it requires excessive pressures. It has now been found that particles of polyvinylarene can be expanded sufficiently by avoiding these high pressures.

Accordingly, the present invention provides a process for the preparation of expandable polyvinylarene particles in which compact polyvinylarene particles are impregnated by an inorganic $N_2$- and/or $O_2$-containing gas at a temperature below 95° C. and at a pressure of 100 to 2,000 kPa gauge.

Compact polyvinylarene particles suitably have an apparent density of more than 600 kg/m$^3$, more suitably more than 620 kg/m$^3$. Generally, the apparent density of these particles will not exceed 700 kg/m$^3$.

Typically, the compact polyvinylarene particles of the present invention are not expandable before they are impregnated with an $N_2$- and/or $O_2$-containing gas. In practice, this means that they contain less than 0.5% by weight, based on the amount of vinylarene, of volatile organic compounds, more preferably less than 0.1% by weight. Most preferably, the compact polyvinylarene particles do not contain any volatile organic compound at all. The amount of water in the compact polyvinylarene particles will suitably not exceed 1% by weight, based on the amount of vinylarene.

The compact polyvinylarene particles may be prepared by various methods, including bulk polymerization, solution polymerisation, and suspension polymerization or mixtures of these methods. Preferably the polymerization is carried out in a bulk polymerization or suspension polymerization process. In bulk techniques, the polymerisation is carried out in a conventional way to obtain small particles (nibs). Suspension polymerisation includes the suspending of vinylarene monomer in an aqueous phase and polymerising the suspended droplets. Both methods ensure that sufficient voids are present in the polymer particles into which the inorganic $N_2$- and/or $O_2$-containing gas can be impregnated.

Suspension polymerisation is suitably carried out in the presence of suspension stabilisers. Suitable suspension stabilisers are well known in the art and comprise poly(vinyl alcohol), gelatine, agar, polyvinyl pyrrolidine, polyacrylamide, inorganic stabilisers such as alumina, bentonite, magnesium silicate or phosphates, like tricalciumphosphate and/or disodiumhydrogen phosphate, optionally in combination with any of the stabilising compounds mentioned earlier. The amount of stabiliser may suitably vary from 0.1 to 0.9% wt, based on the weight of the aqueous phase.

The suspension polymerisation is suitably carried out at two temperature stages, in which the temperature in the first stage is from 85 to 110° C. and in the second stage is from 115 to 140° C.

The polymerization per se is well known in the art. It may be initiated thermally, via free-radical polymerization or via anionic polymerisation. Although all methods are equally possible, preference is given to free-radical polymerization. Suitable free-radical initiators can be selected from conventional initiators for free-radical polymerization. They include in particular organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, t-butyl-peroxy-(2-ethylhexyl)carbonate, hydroperoxides and dihydrocarbyl peroxides, such as those containing $C_{3-10}$ hydrocarbyl moieties, including di-isopropyl benzene hydroperoxide, di-t-butyl peroxide, dicumyl peroxide or combinations thereof. Other initiators different from peroxy compounds are also possible, e.g., α,α'-azobisisobutyronitrile.

The vinylarene comprised in the polymer of the present process consists preferably mainly of styrene. The polyvinylarene may contain up to 10% mole of another vinyl group containing monomer, such as acrylonitril, acrylic or methacrylic acid or esters, substituted styrene, such as chlorostyrene, or α-methylstyrene, or divinylbenzene. However, preferably the vinylarene in the polyvinylarene consists for more than 99% mole of styrene. More preferably, the polyvinylarene is pure polystyrene.

It may be advantageous to polymerise the vinylarene monomers in the presence of other polymers such as polyphenylene oxide. Suitable polyphenylene oxides have been described in EP-A-350137, EP-A-403023 and EP-A-391499. The polyphenylene oxide is preferably present in an amount of between 1 and 30% wt, based on the amount of vinylarene monomers, and may improve the rigidity of the polyvinylarene polymer.

The compact polyvinylarene particles may contain various conventional additives. Such additives include chain transfer agents, cross-linking agents and nucleating agents. Suitable examples of chain transfer agents are $C_{2-15}$ alkyl mercaptans such as n-dodecyl mercaptan, t-dodecyl mercaptan, t-butyl mercaptan and n-butyl mercaptan. Other agents are pentaphenylethane and the dimer of α-methylstyrene. Examples of cross-linking agents are butadiene and divinylbenzene. Nucleating agents are agents that promote cell formation and are suitably used in an amount of 0.01 to 3% by weight, based on vinylarene, preferably in an amount of 0.05 to 2% by weight. Examples of nucleating agents are finely dispersed inorganic compounds, organic compounds and polymer particles. Examples are carbonates compounds such as calcium carbonate, sulphate compounds such as barium sulphate and calcium sulphate, silicate compounds such as talc, clay, magnesium silicate, amorphous silica particles, zeolites, diatomaceous earth, oxides such as magnesium oxide, and titanium oxide, mixtures of sodium bicarbonate with citric acid, organic bromide-containing compounds, naphthalene compounds, polycyclic aromatic hydrocarbons, carbon black, cokes, chars, graphite and diamond dust, paraffin and fatty acid derivatives such as stearate and palmitate compounds. Examples of suitable polymer particles are polyvinylchloride, polypropylene, polyethylene, acrylonitril butadiene styrene rubber, styrene butadiene rubber, styrene/maleic anhydride copolymer and cellulose. Further examples include polar polymers as described in e.g. WO 98/01501 which comprise e.g. starch, and starch modified by esterification or etherification, emulsifiers as described e.g. WO 98/01488 and WO 98/01489 which comprise bisalkylsulphosuccinates, sorbitol-$C_8$–$C_{20}$-carboxylates, and $C_8$–$C_{20}$-alkylxylene sulphonates. Particularly suitable as nucleating agent are polyethylene waxes having a weight average molecular weight of 500 to 5,000, which are typically finely divided through the polymer matrix in a quantity of 0.01–1.0% by weight, based on the amount of vinylarene, preferably from 0.1 to 0.5% by weight.

The compact vinylarene particles may also contain antistatic additives, flame retardants such as hexabromocyclododecane, dyes, filler material, plasticizers, such as white oil, stabilisers and lubricants. The particles are suitably coated with coating compositions comprising silicones, silicates metal or glycerol carboxylates. Suitable carboxylates are glycerol mono-, di- and tri-stearate, zinc stearate, and mixtures thereof. Examples of such compositions have been disclosed in GB patent No. 1,409,285. Instead of stearate, one may also use citrate or palmitate. The coating compositions have been applied to the particles via dry-coating in a ribbon blender or via a slurry or solution in a readily vapourizing liquid.

The compact polyvinylarene particles are impregnated with an inorganic $N_2$- and/or $O_2$-containing gas, at a temperature below 95° C. and at a pressure of 100 to 2,000 kPa gauge. These gases suitably contain more than 90% by volume, based on the volume of the gas, of $N_2$ and/or $O_2$, more suitably more than 95% by volume. "Inorganic" means that the gases according to the present invention may contain at most 1% by volume, based on the volume of the gas, of organic compounds, preferably at most 0.5% by volume. Most preferably, these gases do not contain any organic compounds.

One of the advantageous implications of the present invention is that the inorganic $N_2$- and/or $O_2$-containing gases that are used show a minor interaction with the polymer per se, if any. Many commercial blowing agents, such as volatile hydrocarbons (e.g. ethane, propane, ethylene propylene), volatile halogenated hydrocarbons (e.g. methyl fluoride) or carbon dioxide, dissolve to some extent into the polymer matrix. This means that for some applications they will have to be removed with effort in view of potential negative effects, e.g. in the field of safety, health or toxicology. Such disadvantages are eliminated by using the present invention. The skilled man will appreciate that every gas will dissolve to some extent in the polymer matrix, but the gases used in the present invention are far less soluble in the polymer matrix than the commercial blowing agents mentioned above. The impregnating gas is preferably nitrogen or air. These gases have the additional advantage that they are effective and cheap and have no negative environmental or health impact.

Preferred temperature ranges for the impregnation are from 0 to 50° C., more preferably from 10 to 30° C. Most preferably, the temperature used is room temperature. In this way the voids in the particles are filled with the gas without the polyvinylarene being heated such that it deforms. Such deformation might have a detrimental effect on the structure and properties of the voids and thereby it would have a negative impact on the expandability of the resulting impregnated particles. Moreover, the low temperature ensures that the particles remain free flowing and do not stick to each other, which might occur if the impregnation would be conducted at higher temperatures.

The pressure under which the impregnation takes place is from 100 to 2,000 kPa gauge. Preferred pressures are between 100 and 1,500 kPa gauge, more preferably between 300 and 800 kPa gauge. The employment of lower pressures would mean that the voids would merely be filled with gas, e.g., nitrogen or air, at about atmospheric pressure. Such a replacement would result in an insufficient expansion, if any. Higher pressures than 2,000 kPa gauge are possible, but are undesirable for e.g. economical and safety reasons (e.g. pressure vessels must be better equipped). Moreover, sampling becomes much more difficult.

After the impregnation the impregnated particles can be taken to a conventional expansion unit in order to be expanded to apparent densities lower than that of the compact polyvinylarene particles. There is no necessity to take any specific precautions in taking the particles to the expansion unit. However, it could be useful to do such via a pressure sluice.

Accordingly, the present invention also provides a process for the preparation of expanded polyvinylarene particles in which expandable polyvinylarene particles are prepared by a process as described above, and the impregnated particles thus obtained are expanded to an apparent density lower than that of the compact polyvinylarene particles.

In the expansion process, the impregnated particles are expanded to a final apparent density which is suitably at least 3 times lower than their original density. More suitably, the impregnated particles are expanded to a final apparent density of at least 5 times lower than that of the compact polyvinylarene particles. Although the expansion can be conducted to any density desired, it is practical to conduct the expansion to an apparent density which is up to 20 times, more preferably up to 40 times lower than the apparent densities of the compact polyvinylarene particles.

The expansion process to arrive at the desired final apparent density is typically carried out in steps. Thereto, the expanded polyvinylarene particles obtained after the expansion are advantageously again impregnated ("re-impregnated") with an inorganic $N_2$- and/or $O_2$-containing gas and the thus re-impregnated particles are again expanded. The process of re-impregnation can be repeated up to a number of times. However, the skilled artisan will strive to a balance between the duration of the impregnation in order to maximise the amount of impregnated gas on the one hand and a low number of repetitions of the impregnation and expansion sequence on the other. Suitably this will lead to a process in which the impregnation and expansion steps are repeated between 1 and 4 times.

As already indicated the expansion can be conducted in any conventional expansion unit. This means that the expansion can be effected by the use of hot air, hot water, a hot oil bath, infra red radiation or microwave radiation. It is preferred to use the most common method, i.e., the use of steam. Steam may be used of temperatures of 100 to 168° C. at pressures of 0 to 600 kPa gauge, depending on the presence of additives and/or other polymers in the pre-expanded polyvinylarene particle. In the case of polystyrene, it is preferred to use saturated steam of a temperature of 100–125° C. at pressures of 0 to 230 kPa gauge. It is however observed that other commercial methods can also be used. Expansion by means of hot air having a temperature of 90–200° C., is also suitable in particular for the first expansion step. Preferably, the air has a temperature of 95–160° C. and most preferably from 100–140° C. The exposure preferably has a duration of up to 3 hours.

As already indicated in the description above, expanded particles are suitably put into a mould and heated so that the expanded particles fuse together to produce foamed moulded articles. Therefore the invention further provides a process for preparing a foamed article in which expanded polyvinylarene particles obtained by a process according to this invention are heated in a mould till the polyvinylarene particles soften and stick together, and the heated mould thus obtained is cooled to yield a foamed article. The heating in the mould is conventional and is typically in the range from 110 to 125° C.

The invention will be illustrated by means of the following example(s).

EXAMPLES

All apparent densities were measured in accordance with the following method.

A cylindrical cup of 1000 $cm^3$+/−2 $cm^3$ capacity, having an inside diameter of 66 mm and a height of 293 mm was weighed to the nearest 0.1 gram (atmospheric pressure, room temperature). Subsequently, the cup was filled with polyvinylarene particles. A perfectly flat metal scrapper was used to tap three times against the side of the cup and subsequently to scrape off the excess material on the top of the cup, without shaking the cup. The material in the cup was weighed to the nearest 0.1 gram and the weight of the polyvinylarene particles in grams of 1 $cm^3$ was calculated and converted to $kg/m^3$.

Examples 1 and 2

Compact polystyrene particles were prepared by a suspension polymerisation process. Hereto, 4,000 gram demineralised water, 3,680 gram styrene, conventional suspension stabilisers, were mixed at a stirring rate of 475 rpm. The polymerisation was started by raising the temperature to 86° C. and addition of peroxide initiators. After around 6 hours, the temperature was raised to around 120° C. where it was kept during 2 hours. After finishing the polymerisation, the reaction mixture was cooled.

The particles had an apparent density $d_1$ of 650–630 $kg/m^3$ and a particle size in the range of 700–900 $\mu m$.

Subsequently, the compact polystyrene particles were impregnated with air by storing them in a pressure vessel at room temperature at an air pressure of 600 kPa gauge. After 16 hours, the pressure was released, the impregnated compact polystyrene particles were taken out and placed in a KURTZ KV450 batch steam expander where they were allowed to further expand (KURTZ is a trademark). The expansion conditions are set out in Table I.

From the particles thus obtained, the apparent density $d_2$ was measured.

Subsequently, the particles were again subjected to the impregnation and expansion procedure as described above, with the exception that the pressure was released after two hours. The resulting apparent density $d_3$ was measured.

This procedure was repeated two more times, until a particle having an apparent density $d_5$ was obtained. The results are indicated in Table I.

TABLE I

| Ex. | $d_1$ (kg/m³) | expansion conditions[1] | $d_2$ (kg/m³) | expansion conditions[1] | $d_3$ (kg/m³) | expansion conditions[1] | $d_4$ (kg/m³) | expansion conditions[1] | $d_5$ (kg/m³) |
|---|---|---|---|---|---|---|---|---|---|
| 1 | 630 | P: 150 kPa g. T: 127 ° C. t: 15 sec. | 531 | P: 140 kPa g. T: 126 ° C. t: 15 sec. | 323 | P: 140 kPa g. T: 126 ° C. t: 15 sec. | 90 | P: 80 kPa g. T: 117 ° C. t: 15 sec. | 20.4 |
| 2 | 650 | P: 165 kPa g. T: 129 ° C. t: 15 sec. | 537 | P: 140 kPa g. T: 126 ° C. t: 15 sec. | 324 | P: 140 kPa g. T: 126 ° C. t: 15 sec. | 86 | P: 140 kPa g. T: 126 ° C. t: 15 sec. | 18.8 |

[1]P = steam pressure (kPa gauge)
T = steam temperature (° C.)
t = steaming time (seconds)

What is claimed is:

1. Process for the preparation of expandable polvinylarene particles in which compact polyvinylarene particles are impregnated by an inorganic compound selected from the group consisting of $N_2$- and/or $O_2$-containing gas at a temperature below 95° C. and at a pressure of 100 to 2,000 kPa gauge.

2. Process according to claim 1, in which the polyvinylarene particles are polystyrene particles.

3. Process according to claim 1, in which the compact polyvinylarene particles have an apparent density of more than 600 kg/m$^3$.

4. Process according to claim 1, in which the polyvinylarene particles are impregnated by exposing the particles to the inorganic $N_2$- and/or $O_2$-containing gas at temperatures ranging from 0 to 500° C. and at a pressure of 100 to 1,500 kPa gauge.

5. Process according to claim 1, in which the gas is nitrogen or air.

6. Process for the preparation of expanded polyvinylarene particles in which expandable polyvinlarene particles are prepared by a process according to claim 1, and the impregnated particles thus obtained are expanded to an apparent density lower than that of the compact polyvinylarene particles.

7. Process according to claim 6, in which the impregnated particles are expanded to a final apparent density of at least 5 times lower than that of the compact polyvinylarene.

8. Process according to claim 6, in which expanded polyvinylarene particles obtained after the expansion are again impregnated with an inorganic $N_2$- and/or $O_2$-containing gas and the thus impregnated particles are again expanded.

9. Process according to claim 6, in which the impregnated particles are expanded by exposing them to steam of temperatures of 100–168° C. at pressures ranging from 0 to 600 kPa gauge.

10. Process for preparing a foamed article in which expanded polyvinylarene particles obtained by a process according to claim 6 are heated in a mould till the polyvinylarene particles soften and stick together, and the heated mould thus obtained is cooled to yield a foamed article.

11. Process for the preparation of expandable polyvinylarene particles in which compact polyvinylarene particles containing voids are impregnated by exposing said compact polyvinylarene particles to an inorganic compound selected from the group consisting of $N_2$- and/or $O_2$ containing gas and at a temperature below 95° C. and at a pressure of 100 to 2,000 kPa gauge to maintain the structure and properties of said voids in said compact polyvinylarene particles, wherein said inorganic $N_2$- and/or $O_2$ containing gas contains a low volume of organic compounds and wherein said inorganic $N_2$- and/or $O_2$ containing gas, being less soluble in the polymer matrix compared to said organic compounds, remains essentially in said voids of said compact polyvinylarene particles for an expansion of said particles.

* * * * *